United States Patent [19]

Miyaishi et al.

[11] Patent Number: 4,822,323
[45] Date of Patent: Apr. 18, 1989

[54] ENDLESS TRANSMISSION BELT

[75] Inventors: Yoshinori Miyaishi, Okazaki; Shiro Sakakibara, Anjo, both of Japan

[73] Assignee: Aisin Warner Kabushiki Kaisha, Aichi, Japan

[21] Appl. No.: 113,775

[22] Filed: Oct. 28, 1987

[30] Foreign Application Priority Data

Nov. 4, 1986 [JP] Japan .................. 61-260706

[51] Int. Cl.⁴ .............................. F16G 1/24
[52] U.S. Cl. .................... 474/242; 474/201
[58] Field of Search ............ 474/242, 244, 245, 240, 474/237, 201, 265

[56] References Cited

U.S. PATENT DOCUMENTS 4,512,754  4/1985  Cole, Jr. et al. ............ 474/201 X
4,622,025 11/1986  Kern et al. ................. 474/242 X
4,642,076  2/1987  Howerton .................... 474/201

Primary Examiner—Thuy M. Bui
Attorney, Agent, or Firm—Blum Kaplan

[57] ABSTRACT

An endless transmission belt for transmitting torque between a pair of pulleys including a plurality of pairs of first and second metallic blocks having at least one through holes in alignment with recesses formed in opposite inclined side edges of the block and an endless chain belt for holding said metallic blocks. The endless chain belt is constructed by at least three strands of link plates which are pivotally interconnected with predetermined intervals therebetween with common articulating pins. Each strand of link plates is inserted into each of through holes or holes and recesses and a pair of first and second metallic blocks is retained pivotably between a pair of adjacent pins.

19 Claims, 3 Drawing Sheets

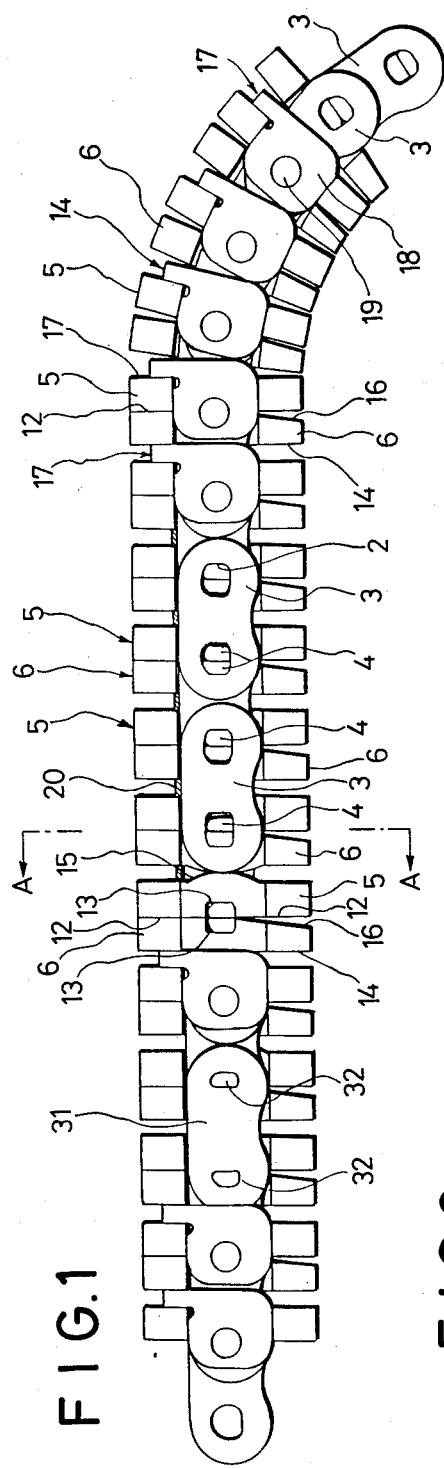
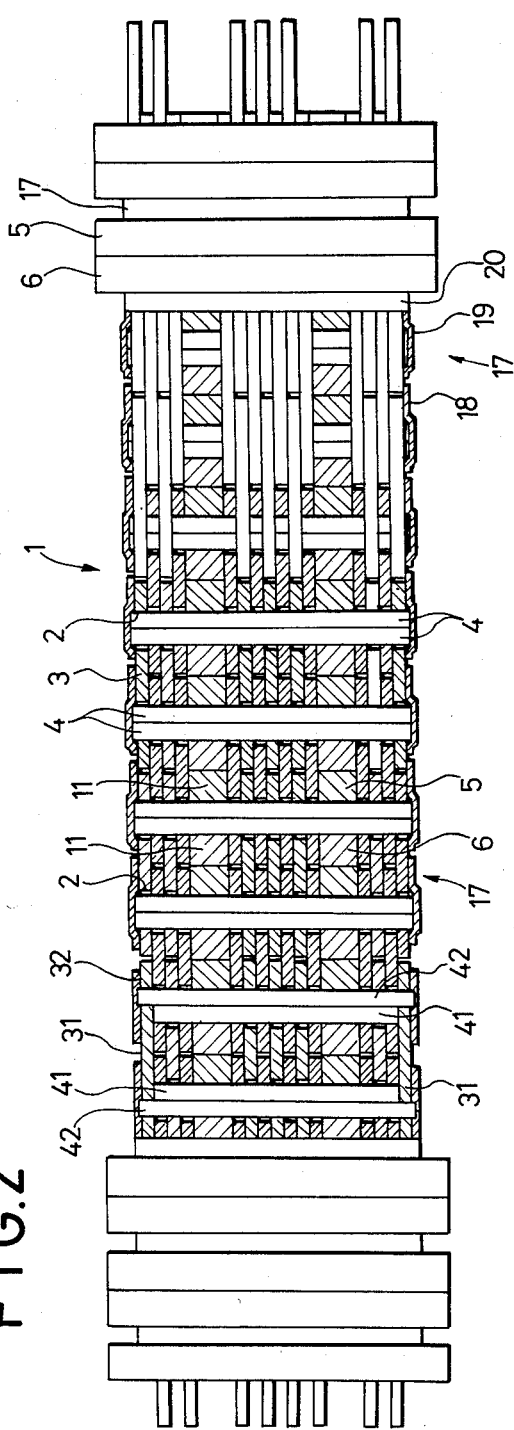
FIG.1
FIG.2

ENDLESS TRANSMISSION BELT

BACKGROUND OF THE INVENTION

1. Field of the Invention

The present invention relates to an endless transmission belt for a V-belt type continuously variable speed transmission.

2. Description of the Prior Art

Japanese Laid-Open Patent application Gazette (Kokai) No. 61-79044 discloses an endless transmission belt for transmitting torque between a pair of pulleys each having a contact surface formed of two coaxial and opposite surfaces of circular cones of a continuously variable speed transmission. This known endless transmission belt comprises a plurality pairs of first and second metallic blocks in which each block being formed in the shape of a trapezoidal plate having opposite inclined side edges partly or entirely provided with inclined contact surfaces to be in contact with the contact surfaces of the pulleys and provided with a through hole or an opening having a predetermined lateral size practically in the center portion thereof with respect to the width, each pair of first and second metallic blocks being placed with the respective first side walls thereof in contact with each other; and an endless chain belt formed by linking a set of thin link plates having a width substantially corresponding to the width of the through hole or the opening formed in the metallic block and connecting the set of thin link plates at the opposite ends to those of the adjacent groups of thin link plates, and passed through the through holes or openings of the metallic blocks, and pairs of pins engaging grooves formed on walls contiguous to the through hole or the opening in the respective second side walls of the pair of first and second metallic blocks, so as to hold the pair of first and second metallic blocks therebetween so that the plurality of first and second metallic blocks are held on the endless chain belt of the link plates.

In this known endless transmission belt, the metallic blocks are held by the respective opposite ends of the pins which extend across the endless chain belt and allow the pivotal motion of the link plates thereon. Therefore, when the metallic blocks engage the pulley during the power transmitting operation of the endless transmission belt, all the stresses such as a force which acts radially outward on the metallic blocks and a force which acts on the metallic block due to the interaction of the link plates and the metallic block for power transmission are concentrated at the both opposite ends of each pin to bend the pin in a curve. Consequently, the link plates on the opposite sides of the parallel arrangement of the link plates are loaded more heavily than the rest of the link plates and hence the link plates located on the opposite outer sides of the parallel arrangement of the link plates in the endless chain belt are more liable to be abraded than the rest of the link plates and in the worst case, are broken. Furthermore, the both opposite ends of the pins are abraded more heavily than the middle portions.

Still further, in an endless transmission belt in which the endless belt is passed through through holes respectively formed in the center portion of respective metallic blocks, a radially inward stress is applied to the lower side of each metallic block by which the respective through hole is closed, to strain the lower side of the same when the metallic block engages the pulley at the time when the inclined contact surfaces formed in the opposite side edges of the metallic block contact to the contact surfaces of the pulleys and pressure is applied thereto. (Refer to U.S. Pat. No. 4,512,754).

SUMMARY OF THE INVENTION

It is an object of the present invention to provide an endless transmission belt that is adapted to suppress the deformation of the pins of such an endless belt, to prevent the abrasion of the link plates and the irregular abrasion of the pins resulting from the deformation of the pins and to improve the durability of the metallic blocks.

According to the present invention, an endless transmission belt has at least three parallel strands of link plates connected by common pins for permitting articulation of the link plates, and metallic blocks as mentioned above which are held by a pair of pins at positions between the strands of the link plates. Recesses are formed in inclined contact surfaces formed in the opposite sides of each metallic block to divide each inclined contact surface into an upper section and a lower section.

To achieve the object of the invention, the present invention provides an endless transmission belt for transmitting torque between a pair of pulleys each having a contact surface formed of the surfaces of two coaxial and opposite circular cones, including a plurality of trapezoidal metallic blocks linked together and each having inclined contact surfaces formed in respective portions of the opposite side edges thereof so as to conform to the contact surfaces of the pulleys which comprises: a plurality of first and second blocks each block being formed in the shape of a trapezoidal plate and having inclined contact surfaces respectively formed in the opposite side edges thereof, at least one through hole having a predetermined lateral size and recesses formed in the opposite side edges in alignment with the through hole and bored in the direction of thickness of said plate, pillar-like portions formed between the through hole and recesses and a groove formed on the surface of the pillar-like portions located in the facing surface of the first and second blocks in the direction of width of the block; an endless belt comprising a parallel arrangement of at least three longitudinally extending strands of thin link plates substantially the same in length, each of said strands being formed by arranging the link plates having the same length side by side in the direction of thickness in a zigzag arrangement; the three strands of link plates being pivotally interconnected with predetermined intervals therebetween with articulating pins each penetrating through the respective component link plates of the strands; retaining members for holding the pins in place against axial displacement by attaching to the opposite ends of each pin at the opposite sides of said endless belt, each of said strands of link plates being passed through the corresponding through hole and recesses of the first and second metallic blocks, respectively, to the direction of the thickness of the block and the pair of first and second metallic blocks being retained between the adjacent articulating pins of the endless belt by contacting with each other so as to be able to turn relative to each other at one surface thereof and receiving said pin in the groove formed in the surfaces of the pillar like portions of each pair of the first and second metallic blocks at the other surface thereof.

According to the present invention, the articulating pins joining the link plates of the endless belt retains the metallic block at least at two positions near the middle thereof between the strands of link plates. Accordingly, the pins of the endless belt are stressed substantially uniformly with respect to the longitudinal direction thereof in transmitting power by properly deciding the respective widths of the strands of link plates, namely, the respective depths of the recesses and the width of the through hole, so that the deformation of the pins in transmitting power is reduced.

Furthermore, since each of the inclined surfaces of the first and second metallic blocks is divided into a upper section and a lower section by the recess formed in the corresponding side edge radially inward stress which is applied to the lower side of the metallic block when the same engages the pulley is absorbed by the recesses and hence excessive concentration of stress does not occur in the metallic blocks.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIGS. 1 to 3 illustrates an endless transmission belt, in a first embodiment, according to the present invention, in which:

FIG. 1 is a partly cutaway side elevation,

FIG. 2 is a partly cutaway top plan view, and

FIG. 3 is a sectional view taken along line A—A in FIG. 1;

FIGS. 4 to 7 illustrates an endless transmission belt, in a second embodiment, according to the present invention, in which:

FIG. 4 is a partly cutaway side elevation,

FIG. 5 is a partly cutaway top plan view,

FIG. 6 is a sectional view taken along line B—B in FIG. 4, and FIG. 7 is a sectional view taken along line B—B in FIG. 4.

DETAILED DESCRIPTION OF THE PREFERRED EMBODIMENTS

Figure 3:
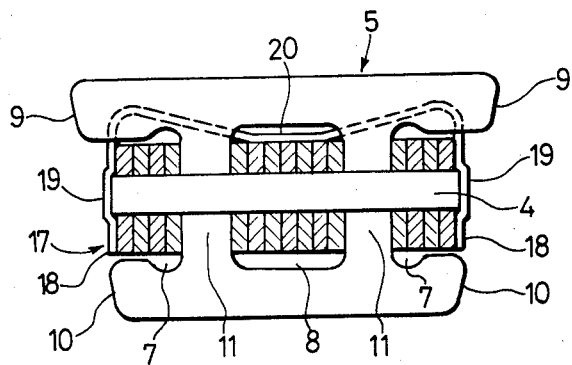

FIGS. 1 to 3 illustrate an endless transmission belt 1, in a first embodiment, according to the present invention, in which FIG. 1 is a partially cutaway side elevation, FIG. 2 is a partially cutaway top plan view, and FIG. 3 is a sectional view taken along line A—A in FIG. 1. The endless transmission belt is formed by arranging a plurality of pairs of first and second metallic blocks in parallel with each other in the direction of thickness thereof and linking the pairs of first and second metallic blocks with endless belts of link plates.

The endless transmission belt 1 comprises three parallel strands of thin metallic link plates 3 extending at appropriate intervals therebetween and interconnected with articulating pins 4. Each strand of the link plates S is formed by successively linking a plurality of sets of the link plates 3 arranged side by side in a predetermined size with respect to the direction of thickness in a zigzag arrangement. That is, each strand of link plates comprises a plurality of interleaved sets of link plates and the pins connecting each set of link plates at the longitudinal ends thereof with next adjacent set of link plates so as to permit articulation of the endless belt. As illustrated in FIG. 1, the articulating pin 4 is a composite pin consisting of two pin members each having, in cross section, a rocking section having the shape of a circular arc of a larger radius, a bottom section having the shape of a circular arc somewhat smaller than the rocking section, and a rotation checking section formed opposite to the rocking section and consisting of a portion having the shape of a circular arc of a small radius, a straight portion and a portion having the shape of a circular arc of a small radius and merging into the straight portion. The articulating pin 4 is inserted through the holes 2 of the link plates 3 with the respective rocking sections of the pin members in contact with each other. The articulating pin 4 is formed in length so that the opposite ends thereof project slightly from the outermost link plates 3 of the three strands of the link plates 3 extending in parallel to each other with suitable intervals therebetween. The through hole 2 of the link plate 3 has an outer half, with respect to the direction of length, having a shape conforming to the shape of the head of the pin 4, and inner half having a semicircular shape. In this embodiment, the central strand has sets of the link plates 3 each of a parallel arrangement of the seven link plates 3, and the outer strands each has sets of the link plates 3 each of a parallel arrangement of the four link plates 3.

Referring to FIG. 3, a first metallic block 5 and a second metallic block 6 each has a generally trapezoidal shape in front elevation having opposite inclined side edges, recesses 7 formed in the respective middle portions of the opposite inclined side edges, respectively, and a through hole 8 formed at the center portion thereof. Inclined contact surfaces 9 and 10 conforming to the conical contact surfaces of the pulleys are formed in the upper section above the recess 7 and lower section below the recess 7 of each side edge of the metallic block, respectively. Each recess 7 has a U-shape having a depth, namely, a size in the direction of width of the link plate 3, appropriate to loosely receiving the corresponding outer strands therethrough. The through hole 8 is formed substantially in the central portion of the metallic block in a rectangular shape having a width in the direction of width of the metallic block appropriate to loosely receiving the central strand therethrough. The recesses 7 formed in the opposite side edges of the metallic block, respectively, and the through hole 8 formed in the central portion of the metallic block are partitioned by pillar-like portions 11. The respective heights of the recesses 7 and the through hole 8 are slightly greater than the width of the link plates 3 of the endless transmission belt 1.

As shown in FIG. 1, the first surface 12 of each of the first metallic block 5 and the second metallic block is a flat plane. Rectangular grooves 13 for receiving the pin 4 are formed substantially across the central portions of the pillar-like portions 11, respectively in the first surface 12. The second surface 14 of each of the metallic blocks 5 and 6 is a flat plane having an arcuate convex portion 15 formed in an area corresponding to the rectangular grooves 13. The top of the convex portion 15 is positioned at the side of the groove 13. The lower portion of the first surface 12 of the second metallic block 8 below the rectangular grooves 13, namely, a portion which positions inside with respect to the radial direction of the pulley, is tapered toward the lower edge in a taper surface 18 so that the distance between the first surface 12 and the second surface 14 diminishes gradually toward the lower edges. The first metallic block 5 and the second metallic block 6 are placed with the respective convex surfaces 15 thereof in contact with each other. The three strands of link plates 3 are passed through the recesses 7 and the through hole 8, respectively, so as to hold the pair of first and second metallic blocks 5 and 6 between the adjacent pins 4. The pins 4 are received in the grooves 13 formed in the respective first surfaces 12 of the first metallic block 5 and the second metallic block 6.

Each of the pins 4 commonly articulating the link plates 3 of the three strands of the endless transmission belt 1 has opposite end portions inserted through the link plates 3 of the outer strands passed through the recesses 7, respectively, a central portion inserted in the link plates of the central strand, and portions between the opposite end portions and the central portion engaging the grooves 13 of the two pillar-like portions 11. Retaining arms 18 respectively formed at the opposite ends of a retaining member 17 formed of a spring plate generally in a U-shape engage the opposite ends of the pin 4, respectively. A cavity 19 is formed substantially in the central portion of each retaining arm 18 to receive the corresponding end of the pin 4 therein. The retaining arm 18 of the retaining member 17 covers substantially the half of the outer surface of the outermost link plate 3 around the hole 2. The connecting portion 20 of the retaining member 17 interconnecting the retaining arms 18 is formed in a predetermined width and a predetermined shape to hold the retaining arms 18 resiliently in contact with the opposite ends of the pin 4, respectively. In attaching the retaining member 17 to the endless transmission belt 1, the connecting portion 20 of the retaining member 17 is placed between the respective second surface 14 of the first metallic block 5 and the second metallic block 6 above the convex portions 15 which are in contact with each other. The connection portion 20 of the retaining member 17 is curved so as to be in contact with the upper edges, namely, the outer edges with respect to the radial direction of the pulleys, of the link plates 3 of the central strand. The width of the connecting portion 20 of the retaining member 17 is the same as or slightly smaller than the size of the gap between the respective second surfaces 14 of the adjacent first metallic block 5 and the second metallic block 6 which are placed with their convex portions 15 in contact with each other between the adjacent pins 4 when the endless transmission belt 1 is extended tight and the link plates 3 form in a straight line.

In assembling the endless transmission belt 1, the link plates 3 of a first set are inserted in the recesses 7 and the through holes 8 of the pair of first and second metallic blocks 5 and 6, the link plates 3 of the first set are connected to those of second set with the pin 4, and those of the final set are connected to those of the first set with the pin 4. The outermost link plates 31 of the final set each has semicircular holes 32. A pin for connecting the link plates 3 of the final set to those of the first set consists of a normal pin member 42 having the normal length and a short pin member 41 having a length shorter than the normal length by a length twice the thickness of the link plate 31. In connecting the link plates 3 of the final set to those of the first set, the short pin member 41 is inserted through the holes 2 formed in the link plates 3, then the outermost link plates 31 are put in place on the outermost sides of the endless transmission belt 1, respectively, and then the normal pin member 42 is pressed in the semicircular holes 32 of the outermost link plates 31 and in the holes 2 of the link plates 3, and further the pin member 42 is caulked to complete the endless transmission belt 1.

In the first embodiment, the pair of metallic blocks 5 and 6 are supported pivotably on the endless transmission belt 1 with the grooves 13 formed across the pillar-like portions 11 in the first surface 12 receiving the pins 4 inserted through the holes 2 formed in the ends of each link plate 3, with the arcuate convex portions 15 formed in the respective second surfaces 14 in contact with each other, and with gaps formed between the taper surfaces 18 formed in the respective lower portions below the grooves 13 thereof, corresponding to the radially inner side of the groove with respect to radial direction of the pulley and second surfaces 14 owing to the arcuate convex portions 15 formed in the second surfaces 14. Accordingly, when the endless transmission belt 1 is extended between a pair of pulleys, the inclined surfaces 9 and 10 formed in the opposite side edges of the metallic blocks 5 and 6 are in contact with the conical contact surfaces of the pulleys, and the endless transmission belt 1 extends along the circumferences of the pulleys to transmit torque between the pair of pulleys. In transmitting a torque from one of the pair of pulleys to the other, the torque is transmitted from the driving pulley to the metallic blocks 5 and 6 which are in contact with the driving pulley, from the metallic blocks 5 and 6 to the pin 4, from the pin to the link plates 3, from the link plates 3 to the metallic blocks 5 and 6 having the inclined contact surfaces 9 and 10 in contact with the driven pulley, and from those metallic blocks 5 and 6 to the driven pulley.

In transmitting the torque, a driving force is transmitted from the metallic plates 5 and 6 to the pin 4, and from the pin 4 to the metallic plates 5 and 6 through the engagement of portions of the pin 4 with the respective bottoms of the grooves 13 formed in the pillar-like portions 11 formed between the recesses 7 and through hole 8 of the metallic blocks 5 and 6, and also from the pin 4 to the link plates 3 and from the link plates 3 to the pin 4 through the engagement of the holes 2 and pins 4 at the opposite end portions and central portion of the pin 4 at the both sides of the pillar-like portions 11. Accordingly, the stress applied to the pin 4 by the link plates 3 is not concentrated only at the opposite ends of the pin 4 as in the conventional endless transmission belt; the stress is distributed to three portions of the pin 4 by the three strands of the link plates 3, and a stress counteracting the stress applied by the link plates 3 to the pin 4 is applied by the two pillar-like portions 11 to the pin 4. Accordingly, the pin 4 will not be bent in a curve during power transmission and the particular abrasion of the outermost link plates 3 is avoided.

In the conventional metallic block having a through hole only in the center portion thereof, an inward radial force acts on the lower side of the through hole to strain the lower side, which causes abnormal abrasion of the inclined contact surfaces of the metallic block or the contact surface of the pulley.

In the first embodiment of the present invention, the recesses 7 are formed in the opposite inclined side edges of the metallic block to divide each inclined side edge into the upper inclined contact surface 9 and the lower inclined contact surface 10, and the pillar-like portions 11 are formed between the recesses 7 and the through hole 8 formed in alignment with the recesses 7. Accordingly, the stress is not concentrated excessively on the lower side of the metallic block and hence the abrasion of the inclined contact surfaces of the metallic block and the pulley is suppressed.

The connecting portion 20 of the retaining member 17 is in resilient contact with the link plates 3, the upper edges of the retaining arms 18 of the retaining member are in resilient contact with the upper edges of the recesses 7 of the metallic blocks 5 and 6 and the cavities 19 formed in the retaining arms 18 receive the opposite ends of the pin therein to hold the pin 4 in place against axial displacement.

Figure 6:
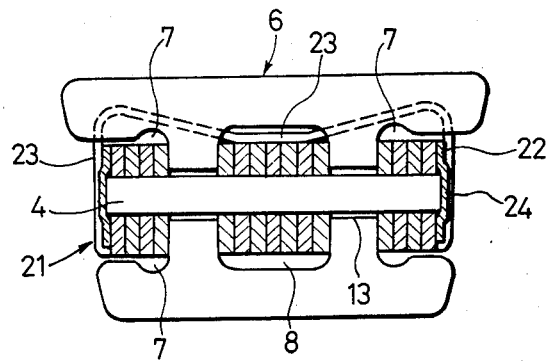
Figure 7:
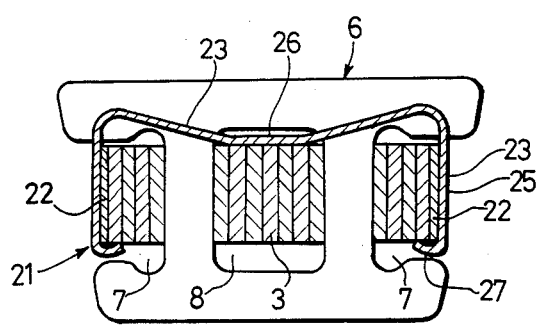
Figure 4:
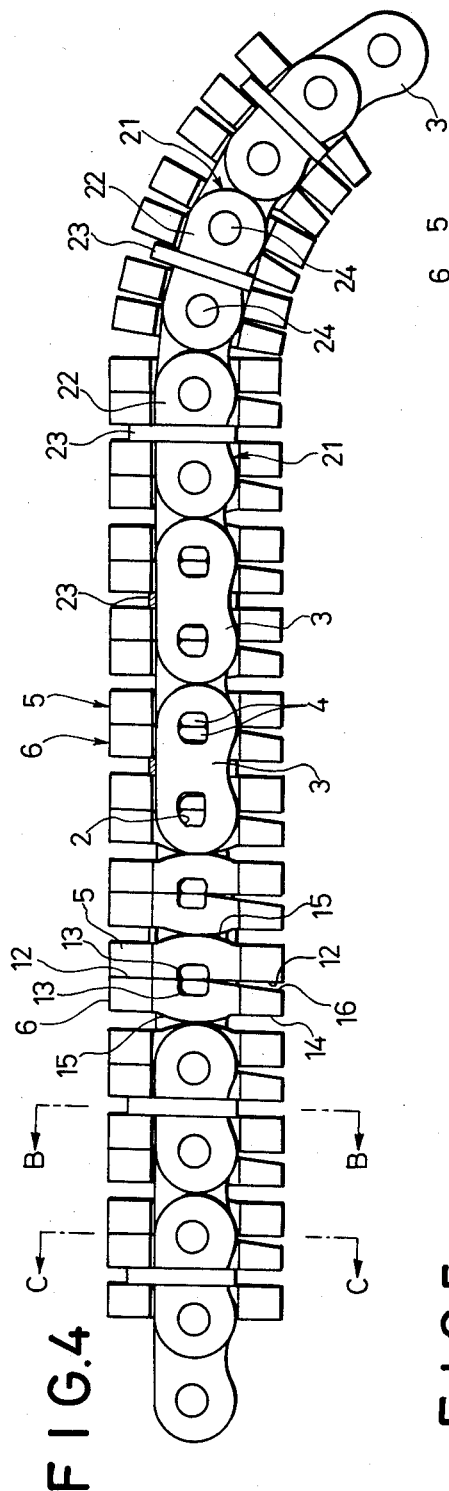
Figure 5:
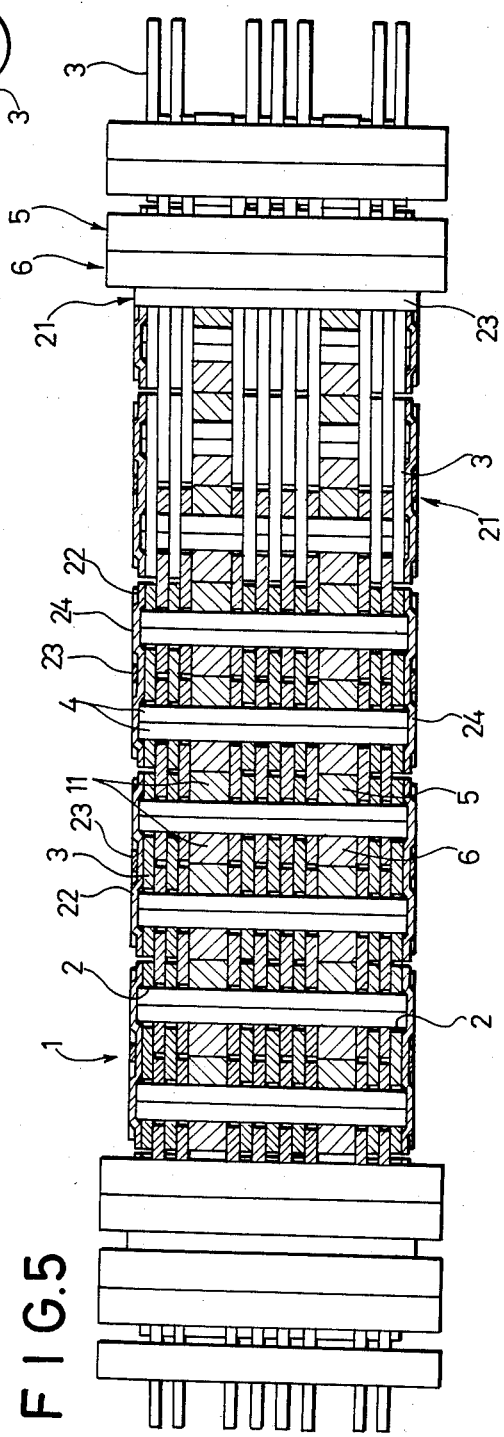

FIGS. 4 to 7 illustrates an endless transmission belt, in a second embodiment, according to the present invention, in which FIG. 4 is a partly cutaway side elevation of the endless transmission belt, FIG. 5 is a partly cutaway top plan view of the endless transmission belt, FIG. 6 is a sectional view taken along line B—B in FIG. 4, and FIG. 7 is a sectional view taken along line C—C in FIG. 4. The second embodiment is similar to the first embodiment except that second embodiment employs a retaining member 21 which is different in construction from that employed in the first embodiment. Accordingly, parts shown in FIGS. 4 to 7 similar to those previously described with reference to FIGS. 1 to 3 are denoted by the same reference numerals and the description thereof will be omitted.

The retaining member 21 is a composite member consisting of cocoon-shaped arm plates 22 each having a straight portion circumscribing the opposite round ends and formed of a spring plate, and a retaining plate 23 formed by bending a spring strip in a U-shape. Two cavities 24 are formed in the arm plate 22 by pressing. The arm plates 22 are put on the respective outermost link plates 3 of sets of link plates 3 respectively received in the recesses 7 of the metallic blocks 5 and 6, respectively, so as to receive the respective opposite ends of pins 4 projecting from the outermost link plates 3 in the cavities 24. In FIG. 7, the retaining plate 23 is placed astride the three strands of the link plates 3 and arm plates 22 with the opposite U-shaped arm portions 25 in resilient contact substantially with the respective middle portion of the arm plate 22, respectively. The retaining plate 23 has a curved connecting portion 28 and U-shaped arm portions 25 formed at the opposite ends of the connecting portion 26, respectively. When the retaining member 23 is put in place, the central portion of the connecting portion 26 is in contact with the upper edges of the link plates 3 of the central strand, and each arm portion 25 is resiliently in contact with the outer surface of the arm plate 22 with a bent portion 27 formed by internally bending the lower edge of the arm portion 25 in contact with the lower edge of the outermost link plates of the outer strands to press the arm plate 22 against the outermost link plate 3 so that the pins 4 are retained in place by the arm plate 22.

Figure 8:
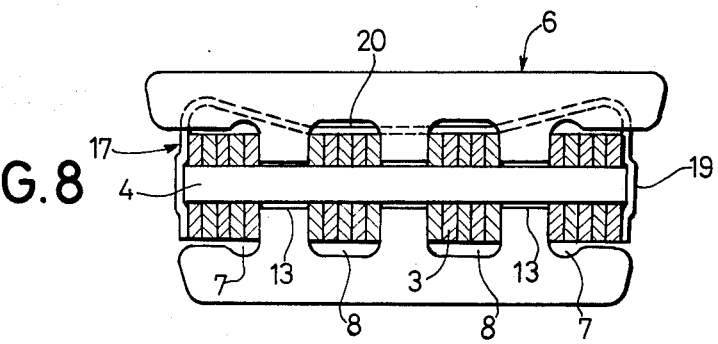
FIG. 8 is a sectional view of an endless transmission belt, in a third embodiment, according to the present invention.

FIG. 8 is a sectional view, similar to FIG. 3, of an endless transmission belt, in a third embodiment, according to the present invention.

In the third embodiment, each of the metallic blocks 5 and 6 is provided with recesses 7 respectively formed in the opposite inclined contact surfaces and two through holes 8 formed between and in alignment with the recesses 7 in the direction of width of the blocks. Accordingly, the metallic blocks 5 and 6 each has three pillar-like portions 11 each having a recess 13 and a convex portion 15. The endless transmission belt 1 in the third embodiment is different from that in the first embodiment only in that the endless transmission belt 1 in the third embodiment comprises four strands of link plates 3 to be inserted into two recesses 7 and two through holes B, respectively. Each strand consists of linked sets of link plates, each having five parallel link plates 3.

The third embodiment employs the metallic blocks 5 and 6 each having three pillar-like portions 11 including an additional one, and four strands of link plates including an additional one in compared with the first and second embodiments. Therefore, each pin 2 engages the link plates at four portions thereof, namely, at the opposite ends and at two inner portions, for power transmission therebetween and engages the metallic blocks 5 and 6 at three portions thereof between those in engagement with the link plates 3 for power transmission therebetween, and hence the pin 4 will not be strained significantly in transmitting power and load is distributed uniformly to the link plates 3.

Thus, the third embodiment, as compared with the first and second embodiments, distributes load more uniformly to the link plates 3, prevents the abrasion of the link plates 3 and the pins 4 more effectively and further improves the durability of the endless transmission belt.

The retaining member 21 employed in the second embodiment may be applied to the third embodiment.

The endless transmission belt according to the present invention comprises trapezoidal metallic blocks each having inclined contact surfaces respectively formed in the opposite inclined side edges thereof on the upper and lower portions of recesses respectively formed in the opposite side edges, and a through hole or holes formed between the recesses in alignment with the same in the direction of width of the blocks, an endless belt comprising a plurality of endless strands, the number of the endless strands corresponding to the total number of the recesses and the through hole or holes, each formed by arranging a plurality of link plates substantially the same in length side by side in a plurality of sets and linking the sets of link plates with common articulating pins in an endless form the strands of the link plates being passed through the recesses and through hole or holes of the metallic blocks, respectively, holding the metallic blocks between the pairs of articulating pins.

Accordingly, in transmitting power from one to the other of a pair of pulleys by the endless transmission belt of the present invention, driving force is transmitted from the metallic blocks to the endless belt consisting of the plurality of strands of link plates and vice versa through the engagement of the pillar-like portions formed between the recesses and the through hole or holes of the metallic blocks, and the articulating pins of the endless belt. Therefore, when the endless belt is consisted of three strands of link plates, each pin engages the link plates at three portions thereof, namely, at the opposite end portions and at the central portion, and engages the metallic blocks at two portions between the portions engaging the link plates for power transmission and, when the endless transmission belt is consisted of four strands of link plates, each pin engages the link plates at four portions, namely, at the opposite end portions and two inner portions, and engages the metallic blocks at three portions between the portions engaging the link plates for power transmission. Accordingly, in transmitting power, the articulating pins are not deformed significantly in a curve and load is distributed uniformly to the link plates, so that the partial abrasion of the link plates and the articulating pins is prevented and the durability of the endless transmission belt is improved.

Furthermore, the metallic blocks of the endless transmission belt each has the recesses in the opposite side edges thereof, and vertical pillar like portions formed between the recesses and through hole or holes interconnecting the upper and lower portions thereof in the radial direction of the pulley. Therefore, the width of the through hole is narrower and the interval between the pillar like portions is smaller as compared with those of a metallic block of the same size having only a central through hole for receiving an endless belt which is the same in width, namely, in the total number of the link plates on the same link pin, and hence, when the metallic block engages a pulley and an inward radial stress is applied to the metallic block, the strain of the lower portion of the metallic block is prevented and excessive concentration of stress on a particular portion will not occur in the metallic block.

As mentioned above, according to the present invention, since the metallic block has recesses in the opposite side edges thereof and a through hole or holes between the recesses for receiving strands of link plates therethrough, each metallic block is formed in a shape including an upper portion extending widthwise and a lower portion extending widthwise which are interconnected with each other by a plurality of pillar-like portions extending perpendicularly, to the upper and lower portions, and inclined contact surfaces which are formed at the free ends of the upper and lower portions. With respect to the endless belt, the belt are divided into a plurality of strands of link plates, the number of the strands corresponding to the total number of the recesses and through hole or holes formed in the metallic block, and the strands of link plates are interconnected b common articulating pins. Accordingly, load applied to the each pin by the strands of link plates or the metallic blocks is not concentrated on the central portion or opposite end portions of the pin and is distributed over the entire length of the each pin. Consequently, the deformation of the articulating pin is prevented, load is distributed uniformly to the link plates and the durability of the endless transmission belt is improved.

Still further, according to the present invention, the two metallic blocks, namely the first and second metallic blocks are retained between two adjacent articulating pins of the endless belt by contacting with each other for relative turning motion at one surface thereof and held pivotably by the pin, respectively, by receiving the pin in the grooves formed across the pillar-like portions. Therefore, the link plates are articulated by the link pins for turning motion relative to the adjacent link plates and relative to the pins, so that the endless transmission belt is flexible along the circumference of the pulley.

Furthermore, the endless transmission belt comprises at least three strands of link plates, and the outermost strands with respect to the longitudinal direction of the articulating pins linking the link plates are passed through the open recesses of the metallic blocks and are retained in the corresponding open recesses by the retaining members each engaging the opposite ends of the pin. Accordingly, there is no possibility that the link plates of the outermost strands of link plates fall off the pins although the outermost strands of link plates are passes through the open recesses.

Incidentally, to prevent the significant strain of the articulating pins linking the link plates of the strands in common, the optimum number of the link plates in the two recesses on the same pin is half (fraction is raised) the number of all the link plates on the same pin plus one or minus 1.

What is claimed is:

1. In an endless transmission belt for transmitting torque between a pair of pulleys each having a contact surface formed of the surfaces of two coaxial and opposite circular cones, the improvement comprising:

a plurality of pairs of facing first and second blocks having opposing side edges, each block being formed in the shape of a trapezoidal plate and having inclined contact surfaces respectively formed in the opposing side edges thereof, at least one through hole having a predetermined lateral size and recesses formed in the opposing side edges in alignment with the through hole, and bored in the direction of thickness of each block, pillar-like portions formed between the through hole and recesses and a groove formed on the surfaces of the pillar-like portions located in the facing surface of the first and second blocks in the direction of width of the block;

an endless belt comprising a parallel arrangement of at least three longitudinally-extending strands of thin link plates, each of said strands being formed by arranging the link plates having the same length side by side in a direction of thickness in a zigzag arrangement, said three strands of link plates being pivotally interconnected with predetermined intervals therebetween with articulating pins each penetrating through the respective component link plates of the strands; and retaining members for holding said pins against axial displacement by attaching to the opposite ends of each pin at the opposite sides of said endless belt;

each of said strands of link plates having widths conforming to the respective sizes of the corresponding recesses and through hole of said first and second metallic blocks, respectively, and passing through the corresponding recesses and through hole of said first and second metallic blocks to the direction of the thickness of the blocks and a pair of the first and second metallic blocks being retained between the adjacent articulating pins by contacting with each other so as to be able to turn relative to each other at one surface thereof and receiving said pin in the groove formed in the surfaces of the pillar-like portions of each pair of the first and second metallic blocks at the other surface thereof.

2. An endless transmission belt according to claim 1, wherein the metallic blocks comprises one through hole at the central portion thereof in alignment with the recesses formed in the opposite side edges thereof and the endless belt comprises three longitudinally-extending strands of thin link plates each of side strands passing said through hole and two recesses, respectively.

3. An endless transmission belt according to claim 1, wherein the metallic blocks comprises two through holes formed between and in alignment with the recesses formed in the opposite side edges thereof and the endless belt comprises four longitudinally-extending strands of thin link plates, each of said strands passing said two through holes and two recesses, respectively.

4. The endless transmission belt of claim 3, wherein the retaining members include an arm plate and a retaining plate, the retaining plate being formed by bending a spring strip into a U-shape and the arm plate having two cavities formed therein, the arm plate being positioned on a link plate and the retaining plate being positioned astride the three strands.

5. The endless transmission belt of claim 4, wherein the retaining plate includes a curved connecting portion and a U-shaped arm portion at opposite ends of the connecting portion and the central portion of the connecting portion is in contact with edges of the link plates of the central strand.

6. An endless transmission belt for transmitting torque between a pair of pulleys, each having a contact surface formed of the surfaces of two coaxial and opposite circular cones, comprising:
   a plurality of pairs of first and second blocks having side edges, each block formed in the shape of a substantially trapezoidal plate, the pair of blocks positioned to have opposed substantially trapezoidally shaped surfaces facing each other so that side edges of the first block are opposite side edges of the second block, the blocks having inclined surfaces for contacting a conical pulley formed in the opposite side edges and a recess formed in the inclined surface to form two noncontinuous contacting surfaces on each inclined surface and each block having at least one through-hole formed through the facing surfaces of each block, the blocks having pillar-like portions separating the recesses and the at least one through-hole and opposing grooves formed in the opposed surfaces of the blocks on the pillar-like portions, the grooves aligned with the recesses and the at least one through-hole, the grooves in the opposed surfaces forming a tunnel;
   longitudinally-extending strands of interleaved link plates passing through the recesses and the at least one through hole of the blocks, each link plate having at least two apertures and articulating pins penetrating the apertures of the link plates to pivotally connect the link plates, the articulating pins being received in the tunnel formed by the opposed grooves in the pillar-like portions to pivotally link the pairs of blocks to the strands of link plates; and
   retaining means for holding said pins and link plates in place.

7. The endless transmission belt of claim 6, wherein the surface of each block that faces away from the other block of the pair has a convex bulge.

8. The endless transmission belt of claim 6, wherein a surface of one block that faces the other block is tapered away from the other block so that it is thicker near the recesses and groove, and tapers to a thinner end.

9. The endless transmission belt of claim 6, wherein there is one through-hole.

10. The endless transmission belt of claim 6, wherein the number of link plates received in each recess is within one of half of the number of link plates mounted on the pin increased to the nearest whole number.

11. The endless transmission belt of claim 6, wherein force is transmitted directly from said pulley to the block to the pin.

12. A block for use in an endless transmission belt, the belt including a series of such blocks that are pivotally connected with strands of interleaved link plates, the link plates pivotally connected with articulating pins, the belt for transmitting torque between a pair of pulleys, each pulley having a contact surface formed on the surfaces of two coaxial and opposite circular cones, the block comprising:
   a substantially trapezoidally shaped plate having a substantially trapezoidally shaped first and second surface, inclined side surfaces for contacting a conically shaped pulley, a top surface facing inwardly when a transmission belt curves around a pulley and a bottom surface facing outwardly when a transmission belt curves around a pulley;
   a side recess formed in each inclined side to yield two noncontinuous pulley contacting surfaces on each inclined side;
   at least one through-hole formed through the first and second surface, the at least one through-hole and each side recess being aligned, the through holes and side recesses each configured to receive a strand of said link plates, the block having pillar-like portions separating the at least one through-hole from the recesses; and
   a groove formed in the substantially trapezoidally shaped first surface of the block on the pillar-like portions, the groove aligned with the recesses and the at least one through-hole and configured to receive an articulating pin that is part of a strand of link plates.

13. The block for use in an endless transmission belt of claim 12, wherein the trapezoidally shaped second surface has a convex bulge aligned with the groove.

14. The block for use in an endless transmission belt of claim 12, wherein the region of the substantially trapezoidally shaped first surface intermediate the groove and the bottom surface is a declining surface such that the thickness of the block directly below the groove is greater than the thickness of the block at the bottom surface of the block, and the block tapers from the groove to its bottom surface.

15. The block for use in an endless transmission belt of claim 12, wherein there are two through-holes.

16. An endless transmission belt for transmitting torque between a pair of pulleys, each pulley having a contact surface formed of the surface of two coaxial and opposite circular cones, the transmission belt comprising:
   substantially trapezoidally shaped blocks having inclined side surfaces with recesses formed therein such that each side surface has at least two pulley contacting surfaces and at least one through-hole formed through the block and pillar-like portions separating the recesses from the at least one through-hole, the pillar-like portions having lateral grooves formed therein, the grooves, the recesses and the at least one through-hole all aligned; and
   articulating pins and interleaved link plates pivotally collected with the articulating pins, threaded through the recesses and the at least one through-hole, the pins being mounted in the grooves so that force from a pulley is applied directly from a pulley to the block to the articulating pin at a region of the articulating pins that is more centrally located than the end region of the articulating pins and link plates are positioned between the pillar-like portions and each end region of the articulating pins.

17. The transmission belt of claim 16, wherein force is transmitted between the articulating pins and the link plates at both the end regions of the articulating pin and a centrally located region of the articulating pin.

18. The transmission belt of claim 16, and including pairs of opposing blocks constructed and arranged so that a surface of at least one block located inward of the articulating pin declines away from the other opposing block of the pair so that as the belt curves around a pulley, the inward portions of the pair of blocks does not interfere with the curving of the belt.

19. The improved transmission belt of claim 16, and further including pairs of blocks, the pairs of blocks having surfaces that face the other block of the pair and non-facing surfaces, the non-facing surfaces of the pair of blocks having a convex bulge.

* * * * *